(12) United States Patent
Chang et al.

(10) Patent No.: US 11,275,243 B2
(45) Date of Patent: Mar. 15, 2022

(54) HOLOGRAM REPLICATOR ASSEMBLIES FOR HEAD UP DISPLAYS INCLUDING CONTINUOUS TRANSMISSION NEUTRAL DENSITY FILTERS AND CORRECTIVE LEVELING ELEMENTS

(71) Applicants: GM GLOBAL TECHNOLOGY OPERATIONS LLC, Detroit, MI (US); Envisics Ltd., Milton Keynes (GB)

(72) Inventors: Kai-Han Chang, Madison Heights, MI (US); Thomas A. Seder, Fraser, MI (US); Jamieson Leigh Christmas, Milton Keynes (GB)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 16/549,606

(22) Filed: Aug. 23, 2019

(65) Prior Publication Data

US 2021/0055549 A1 Feb. 25, 2021

(51) Int. Cl.
*G02B 27/01* (2006.01)
*G03H 1/22* (2006.01)
*B60K 35/00* (2006.01)

(52) U.S. Cl.
CPC ......... *G02B 27/0103* (2013.01); *B60K 35/00* (2013.01); *G03H 1/2205* (2013.01);
(Continued)

(58) Field of Classification Search
CPC ............. B60K 2370/785; B60K 35/00; B60K 2370/333; B60K 2370/1529;
(Continued)

(56) References Cited

U.S. PATENT DOCUMENTS 4,035,070 A * 7/1977 Hammond ....... G03G 15/04027
399/177
9,715,067 B1 7/2017 Brown et al.
(Continued)

OTHER PUBLICATIONS

U.S. Appl. No. 16/363,536, filed Mar. 25, 2019, Chang et al.
(Continued)

*Primary Examiner* — Jade R Chwasz

(57) ABSTRACT

A replicator assembly includes reflective, transmissive, and transparent elements. The reflective element receives and reflects a hologram of a HUD system. The transmissive element includes a partially transmissive portion that receives a reflection of the hologram from the reflective element, outputs N replications of the hologram, and reflects N−1 replications of the hologram. The partially transmissive portion is implemented as a continuous transmission neutral density filter across different phase regions. The phase regions of the partially transmissive portion correspond respectively to the N replications. N is an integer greater than or equal to 2. The reflective element reflects the N−1 replications of the hologram. The transparent element is disposed between the reflective and transmissive elements and guides the N replications of the hologram between the reflective and transmissive elements. The reflective, transmissive and transparent elements are implemented as a replicator and collectively provide the N replications of the hologram.

18 Claims, 12 Drawing Sheets

(52) U.S. Cl.
CPC ......... *G03H 1/2286* (2013.01); *G03H 1/2294* (2013.01); *B60K 2370/1529* (2019.05); *B60K 2370/29* (2019.05); *B60K 2370/31* (2019.05); *B60K 2370/33* (2019.05); *B60K 2370/333* (2019.05); *B60K 2370/349* (2019.05); *G02B 2027/0118* (2013.01); *G03H 2001/2234* (2013.01); *G03H 2222/13* (2013.01); *G03H 2222/34* (2013.01); *G03H 2223/24* (2013.01); *G03H 2225/32* (2013.01); *G03H 2240/11* (2013.01)

(58) Field of Classification Search
CPC ............ B60K 2370/31; B60K 2370/29; B60K 2370/349; B60K 2370/33; G02B 2027/0105; G02B 2027/0109; G02B 27/0103; G02B 2027/0118; G03H 1/2294; G03H 1/2205; G03H 1/2286; G03H 2240/11; G03H 2222/13; G03H 2222/34; G03H 2225/32; G03H 2223/24; G03H 2001/2234

USPC .......................................................... 359/14
See application file for complete search history.

(56) References Cited

U.S. PATENT DOCUMENTS

2012/0002256 A1* 1/2012 Lacoste .............. G02B 27/0081
359/9
2017/0075119 A1 3/2017 Schultz et al.

OTHER PUBLICATIONS

U.S. Appl. No. 16/373,056, filed Apr. 2, 2019, Chang et al.
U.S. Appl. No. 16/379,439, filed Apr. 9, 2019, Chang et al.
U.S. Appl. No. 16/418,574, filed May 21, 2019, Chang et al.
U.S. Appl. No. 16/531,744, filed Aug. 5, 2019, Chang et al.

* cited by examiner

HOLOGRAM REPLICATOR ASSEMBLIES FOR HEAD UP DISPLAYS INCLUDING CONTINUOUS TRANSMISSION NEUTRAL DENSITY FILTERS AND CORRECTIVE LEVELING ELEMENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to display systems and methods for vehicles and more particularly to head up display systems of vehicles.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information by forming a virtual image at a certain distance with reflection of a windshield. For example, the HUD may display a vehicle speed and other vehicle information.

SUMMARY

A replicator assembly is provided and includes a first reflective element, a first transmissive element, and a first transparent element. The first reflective element is configured to receive and reflect a first hologram generated by one or more light sources and one or more modulators of a head up display system. The first transmissive element includes a partially transmissive portion. The partially transmissive portion is configured to receive a reflection of the first hologram from the first reflective element, output N replications of the first hologram, and reflect at least N−1 replications of the first hologram. The partially transmissive portion is implemented as a continuous transmission neutral density filter across different phase regions. The phase regions of the partially transmissive portion correspond respectively to the N replications. N is an integer greater than or equal to 2. The first reflective element is configured to reflect at least the N−1 replications of the first hologram. The first transparent element is disposed between the first reflective element and the first transmissive element and configured to guide the N replications of the first hologram between the first reflective element and the first transmissive element. The first reflective element, the first transmissive element and the first transparent element are implemented as a first replicator and collectively provide the N replications of the first hologram.

In other features, the first transmissive element comprises a fully transmissive portion. The fully transmissive portion is configured to receive the first hologram generated by the light source of a head up display system. The first transparent element is configured to guide the first hologram from the fully transmissive portion to the first reflective element.

In other features, the partially transmissive portion has an intensity gradient across an output of the partially transmissive portion.

In other features, the partially transmissive portion has an intensity distribution across an output of the partially transmissive portion such that output light intensities of the N replications are at least one of at a same level or within a predetermined range of each other.

In other features, the first replicator outputs the N replications with gaps between the N replications. Each of the gaps are greater than 0 and less than or equal to a predetermined minimum human pupil size.

In other features, a corrective leveling element is disposed on the transmissive element and is configured to: receive the N replications of the first hologram output from the first transmissive element; and adjust light intensity levels, such that light intensity levels of N replications of the first hologram output from corrective leveling element are more uniform than the light intensity levels of the N replications of the first hologram output from the first transmissive element.

In other features, the corrective leveling element includes an absorption gradient across an output of the corrective leveling element. The absorption gradient is based on a density of at least one of nanowires or nanoparticles in the corrective leveling element.

In other features, the corrective leveling element includes multiple dielectric layers. At least two of the dielectric layers have different indexes of refraction and a thickness gradient across an output of the corrective leveling element.

In other features, the first reflective element is in contact with the first transparent element. The first transparent element is in contact with the first transmissive element.

In other features, no gaps exist between the first reflective element and the first transparent element and no gaps exist between the first transparent element and the first transmissive element.

In other features, the replicator assembly includes a second replicator where the second replicator includes a second reflective element, a second transmissive element, a second transparent element and a corrective leveling element. The second reflective element is configured to receive and reflect the N replications of the first hologram output from the first transmissive element. The second transmissive element includes a partially transmissive portion. The partially transmissive portion is configured to receive reflections of the N replications from the second reflective element, output N×M replications of the first hologram, and reflect at least N×M−N replications of the first hologram. The partially transmissive portion of the second transmissive element is implemented as a continuous transmission neutral density filter across different phase regions. The phase regions of the partially transmissive portion of the second transmissive element correspond respectively to the N×M replications. The second reflective element is configured to reflect at least the N×M−N replications of the first hologram. The second transparent element is disposed between the second reflective element and the second transmissive element and configured to guide the N×M replications of the first hologram between the second reflective element and the second transmissive element. The corrective leveling element disposed on the second transmissive element and configured to: receive the N×M replications of the first hologram output from the second transmissive element; and adjust light intensity levels, such that light intensity levels of N×M replications of the first hologram output from corrective leveling element are more uniform than the light intensity levels of the N×M replications of the first hologram output from the second transmissive element.

In other features, the partially transmissive portion of the second transmissive element is implemented as a continuous transmission neutral density filter without gaps between different phase regions. The phase regions of the partially transmissive portion of the second transmissive element correspond respectively to the N×M replications. M is an integer greater than or equal to 2.

In other features, the second replicator outputs the N×M replications with gaps between the N×M replications. Each of the gaps are greater than 0 and less than or equal to a predetermined minimum human pupil size.

In other features, a head up display system includes: the replicator assembly; a control module configured to generate signals based on data, where the data includes at least one operating parameter; and the one or more light sources and the one or more phase modulators configured to generate the first hologram based on the signals.

In other features, a replicator assembly for a head up display system is provided. The replicator assembly includes first replicator and a corrective leveling element. The first replicator receives a first hologram generated by one or more light sources and one or more modulators of a head up display, replicates the first hologram N times, and outputs N replications of the first hologram, where N is an integer greater than or equal to 2. The corrective leveling element is configured to adjust light intensity levels of the N replications of the first hologram, such that light intensity levels of N replications output from corrective leveling element are more uniform than the light intensity levels of the N replications of the first hologram output from the first replicator.

In other features, the first replicator includes a partially transmissive portion. The partially transmissive portion is implemented as a continuous transmission neutral density filter without gaps between different phase regions of the partially transmissive portion. The phase regions correspond respectively to the N replications.

In other features, the replicator assembly includes a second replicator disposed between the first replicator and the corrective leveling element. The second replicator is configured to receive the N replications, replicate the N replications M times, and output N×M replications of the first hologram. The corrective leveling element is configured to adjust light intensity levels of the N×M replications of the first hologram, such that the light intensity levels of the N×M replications output from corrective leveling element are more uniform than the light intensity levels of the N×M replications output from the second replicator.

In other features, the second replicator includes a partially transmissive portion implemented as a continuous transmission neutral density filter without gaps between different phase regions of the partially transmissive portion of the second replicator. The phase regions of the partially transmissive portion of the second replicator correspond respectively to the N×M replications.

In other features, the corrective leveling element includes an absorption gradient across an output of the corrective leveling element. The absorption gradient is based on a density of at least one of nanowires or nanoparticles in the corrective leveling element.

In other features, the corrective leveling element includes multiple dielectric layers. At least two of the dielectric layers have different indexes of refraction and a thickness gradient across an output of the corrective leveling element.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include a holographic head up display (HUD) that includes a phase modulator and a coherent or partially coherent light source. The phase hologram is encoded on a phase modulator. A coherent or partially coherent light source illuminates the phase modulator with encoded phase hologram and is diffracted. The diffracted light is reflected by a windshield of the vehicle and forms a real image on a driver's retina. Without replicating or steering the phase hologram, only the single hologram will be presented, and the HUD system may have a relatively small eye box/exit pupil (viewing area).

Existing methods for replicating a hologram include holographic waveguides and volumetric Bragg reflection gratings that require structures (e.g., a photographic polar dispersing device and a holographic diffuser) having micrometer-scale precision to perform light diffraction and replication of a hologram. The feature size and periodicity of existing components are also highly wavelength dependent. Replicators and replicator assemblies are disclosed herein that include reflective, transmissive, and absorptive filters, which are wavelength independent. There is no need to stack multiple components to compensate for wavelength dependencies. The replicators and replicator assemblies have millimeter-scale precision requirements and thus have reduced manufacturing complexity over traditional replicating methods.

A replicator may be used to replicate the hologram and output N identical holograms, where N is an integer greater than or equal to 2. Providing N identical holograms increases the size of the eye box/exit pupil of the HUD system. The N identical holograms may not overlap each other. As disclosed herein, a gap between each of the N identical holograms is greater than or equal to zero and less than or equal to an estimate of a predetermined minimum diameter of a human pupil (e.g., 2 millimeters). This ensures continuity of the virtual images while the viewer's eyes are moving. As an example, a hologram may be replicated multiple times to provide an array of holograms, where each of the holograms contains the same information. Each eye of a viewer sees only one of the holograms at a time. A first eye of the user sees a different one of the holograms than the other eye of the user.

Although examples are disclosed herein with respect to vehicle implementations, the examples are applicable to non-vehicle implementations.

Figure 1:
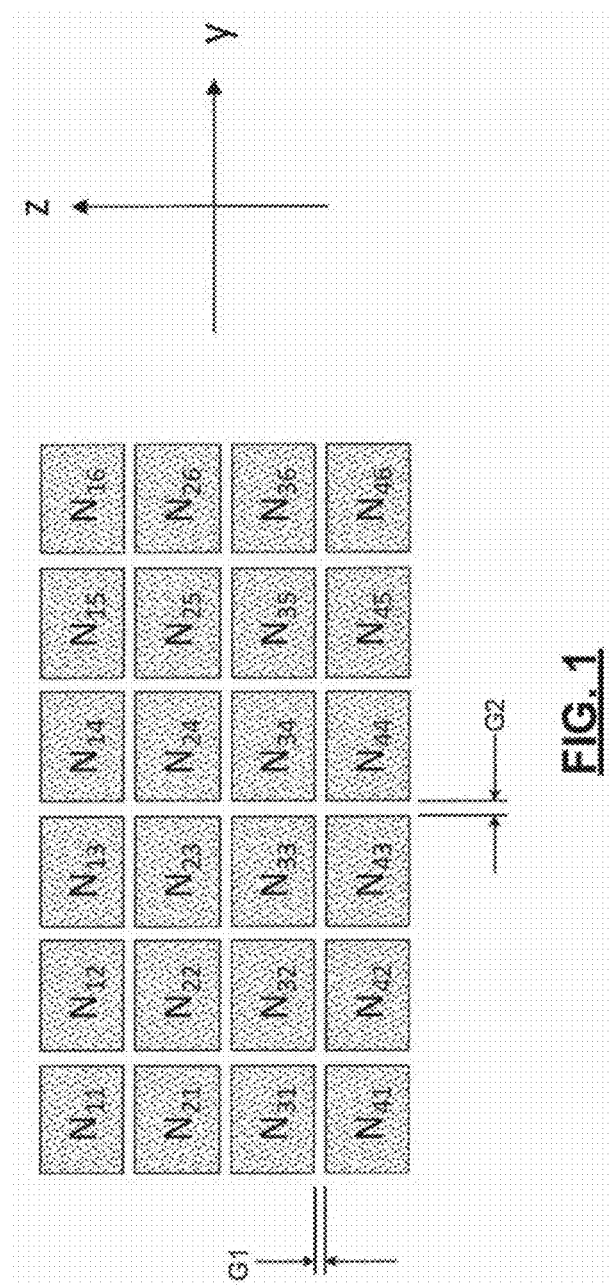
FIG. 1 is an example of a hologram being replicated in two directions (dimensions)

FIG. 1 is an example of a hologram being replicated in two directions (dimensions), a y direction and a z direction. Replicating the hologram enlarges the eye box. In the example of FIG. 1, one hologram is replicated (identically) 24 times, 4 times in the z direction and 6 times in the y direction. As discussed further below, the present application involves use of one or more replicators to replicate a hologram in one or more different directions. Although the examples illustrate a certain number of replications, the replicators may replicate holograms any number of times.

Figure 2:
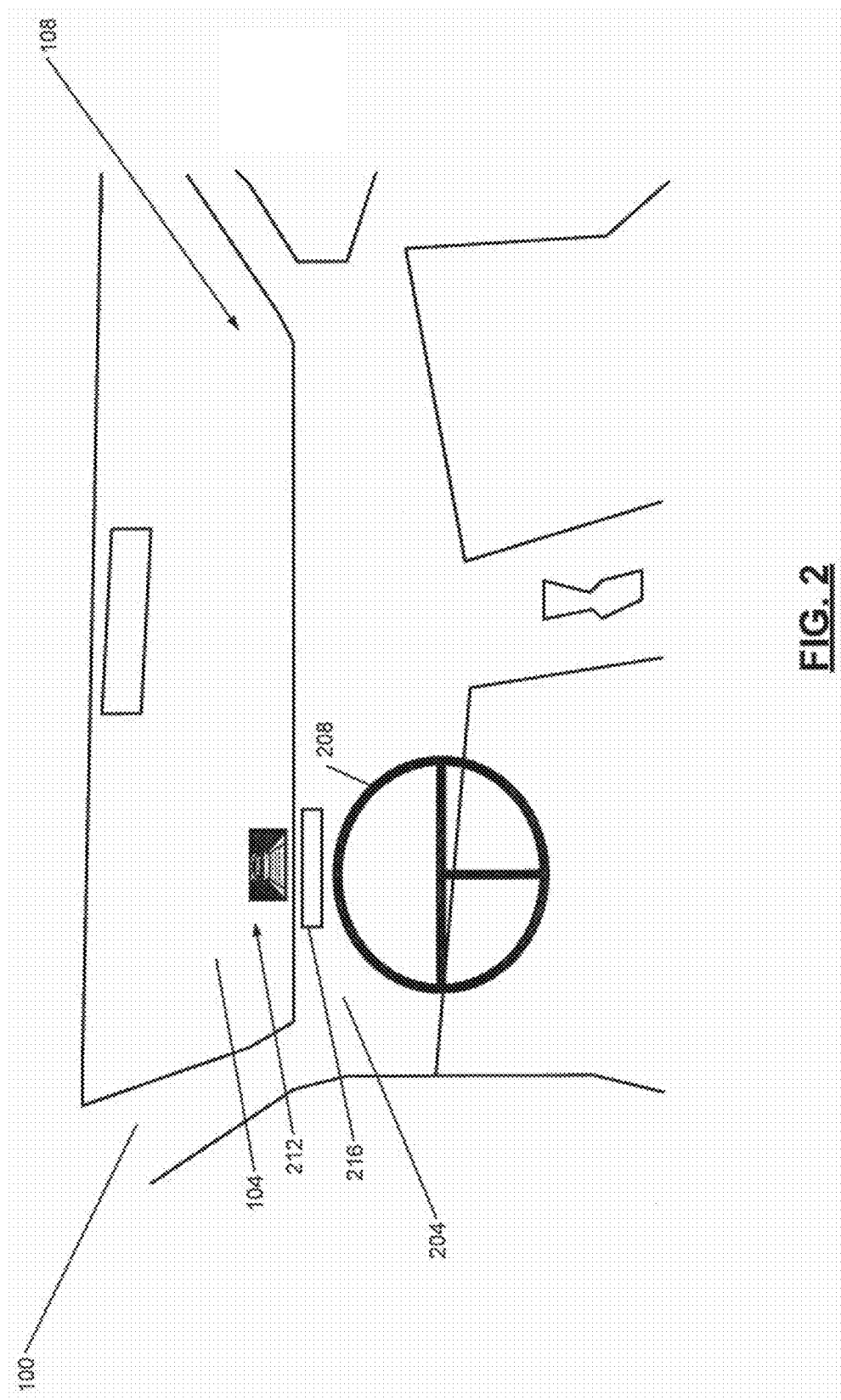
FIG. 2 is an example perspective view from of a driver seat within a passenger cabin of a vehicle.

FIG. 2 includes an example perspective view from a driver seat of a vehicle 100. The vehicle 100 includes a windshield 104 located in a front opening of the vehicle 100. Passengers within a passenger cabin 108 of the vehicle 100 can look through the windshield 104 to see in front of the vehicle 100. While the example of a land-based vehicle is described, the present application is also applicable to air-based vehicles (e.g., airplanes, helicopters, etc.) and water-based vehicles (e.g., boats, etc.). Also, while the example of a vehicle is provided, the present application is also applicable to non-vehicle implementations.

As shown in FIG. 2, the windshield 104 is visually located above a dashboard 204 of the vehicle 100. The vehicle 100 may include a steering wheel 208. The vehicle 100 may be an autonomous vehicle, a semi-autonomous vehicle, or a non-autonomous vehicle.

A head up display (HUD) system 300 (shown in FIG. 3) projects a hologram 212 onto a portion of the windshield 104 through an aperture 216 in the dashboard 204. The hologram 212 includes various vehicle information, such as a present speed of the vehicle 100, a present gear of a transmission of the vehicle 100, an engine speed, a directional heading of the vehicle 100, present infotainment system settings, and/or other vehicle information. The hologram 212 presents data to the driver of the vehicle without the driver having to look away from objects in front of the vehicle. As discussed further below, the hologram 212 includes replicated instances of one hologram.

Figure 3:
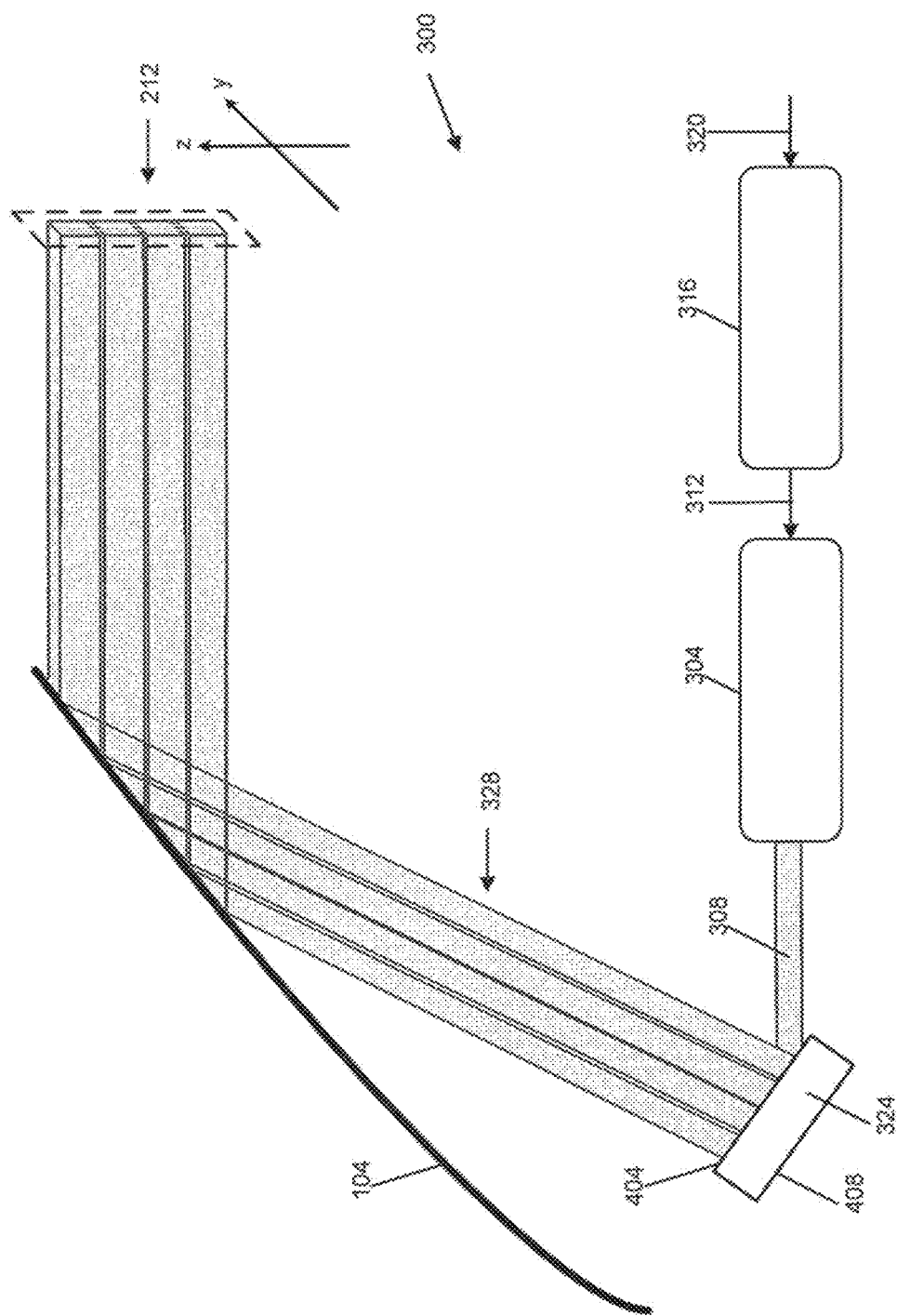
FIG. 3 includes a functional block diagram of an example implementation of a head up display (HUD) system.

FIG. 3 includes an example implementation of the HUD system 300. Light sources and phase modulators 304 provide encoded phase holograms 308 for projection onto the windshield 104 based on signals 312 from a HUD control module 316. For example only, the light sources may include one or more lasers and output red, green, and blue light. The HUD control module 316 generates the signals 312 based on vehicle data 320.

The HUD control module 316 may obtain the vehicle data 320, for example, from a communication bus of the vehicle 100. The vehicle data 320 may include, for example, the present speed of the vehicle 100, the present gear of the transmission of the vehicle 100, the present engine speed, the present directional heading of the vehicle 100, the present infotainment system settings, and/or the other vehicle information.

Figure 8:
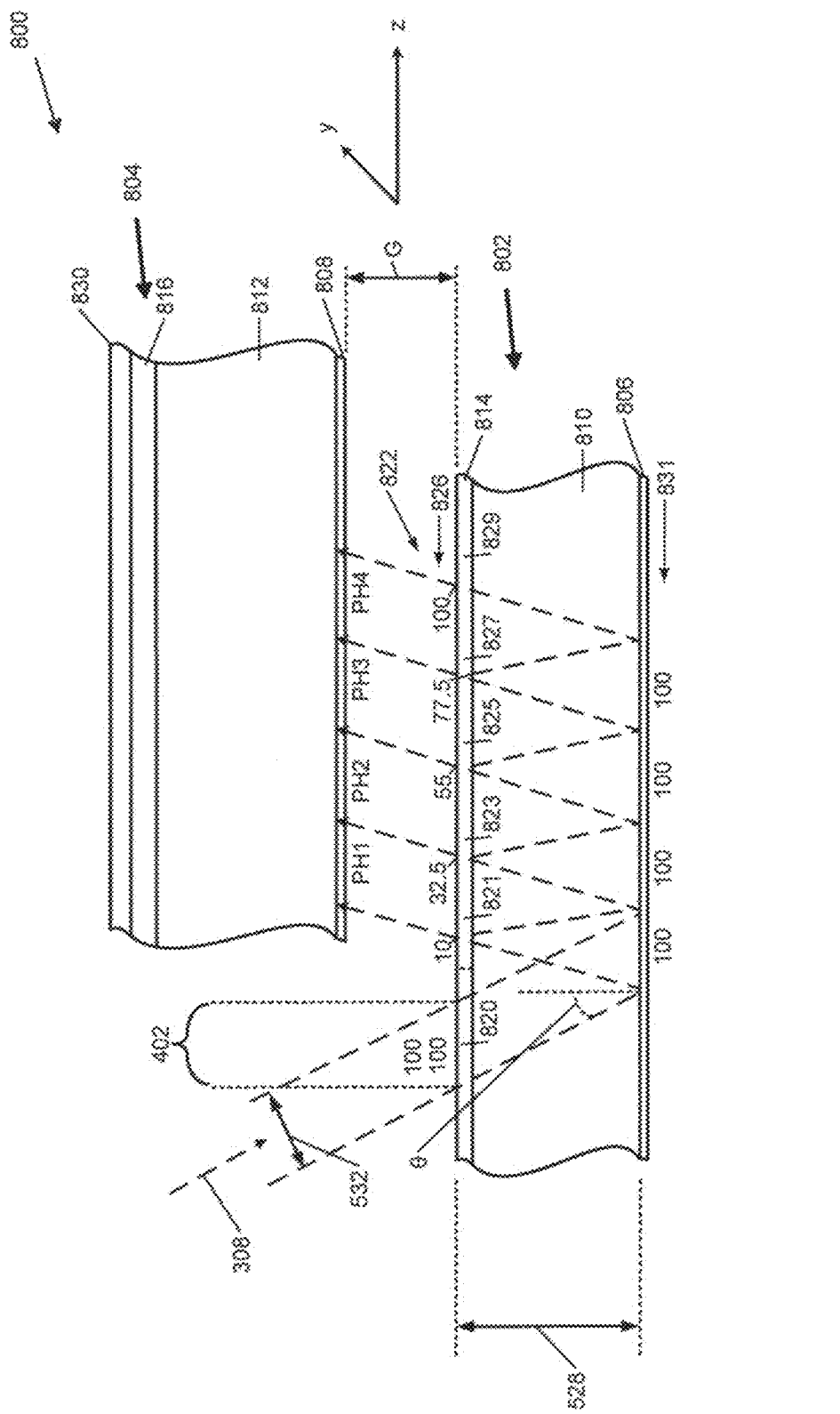
FIG. 8 includes cross-sectional view of a replicator assembly including multiple replicators having continuous transmission neutral density filter layers and a corrective leveling element.

A replicator 324 replicates the phase hologram 308 N times and outputs the N replicated phase holograms 328 toward the windshield 104 through the aperture 216 (shown in FIG. 2), where N is an integer greater than or equal to 2. By replicating the phase hologram 308 and outputting the N replicated phase holograms 328, the replicator 324 increases the size of the exit pupil (viewing area) of the HUD system 300. The replicator 324 replicates the phase hologram 308 in one direction. In various implementations, the vehicle may include one or more other replicators that may be similar or identical to the replicator 324 that replicate the phase hologram 308 in one or more other directions, respectively. For example, the replicator 324 may replicate the phase hologram 328 in the z direction, and another replicator that is similar to the replicator 324 may replicate the phase hologram 328 in the y direction. An example including multiple replicators is shown in FIG. 8.

A gap between each of the N replicated phase holograms 328 is smaller than a predetermined minimum human pupil size to ensure the continuity of virtual images while the viewer's eyes are moving within the eye box. The predetermined minimum human pupil size may be approximately equal to or equal to 2 millimeters (mm) in diameter. The gap between each of the N replicated phase holograms 328 satisfies the relationship 1.

$$0 \text{ mm} \leq \text{gap} \leq \text{predetermined minimum human pupil size} \quad (1)$$

For the relationship 1, the gap is the gap between each of the N replicated phase holograms 328. Example gaps G1 and G2 are shown in FIG. 1. The gaps G1 and G2 may be equal to each other. The gap G1 is an example of the gaps between rows of the holograms 328 and the gap G2 is an example of the gaps between the columns of the holograms 328. The hologram 212 includes the N replicated phase holograms 328. The gap satisfying the above relationship ensures that the N replicated phase holograms 328 do not overlap one another. Also, if a pupil is located in the gap between two of the N replicated phase holograms 328, the eye is still able to view part of the hologram and maintain image continuity.

Figure 4:
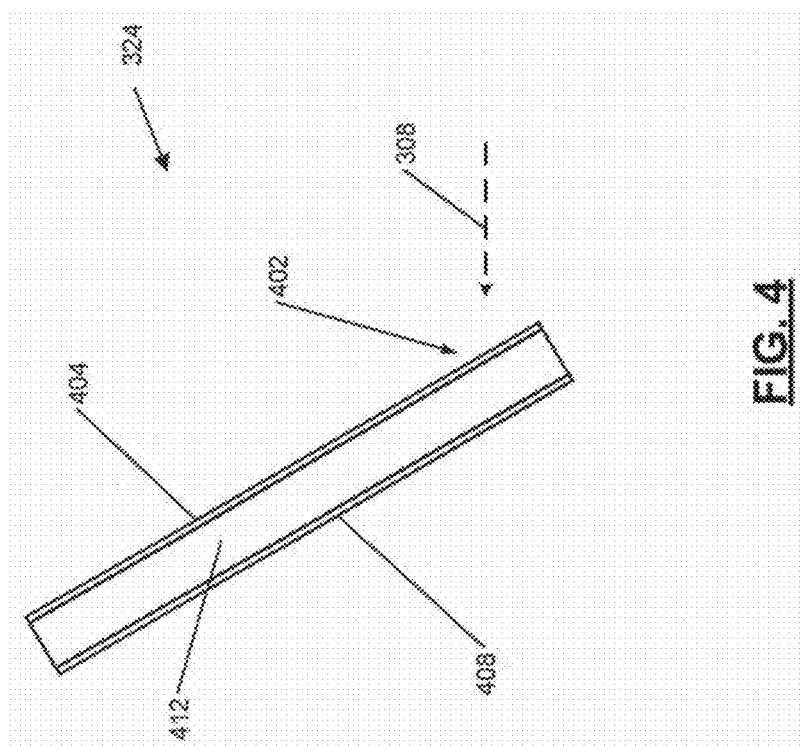
FIG. 4 includes a cross-sectional view of an example implementation of a replicator.

FIG. 4 includes a cross-sectional view of an example implementation of the replicator 324. The replicator 324 includes a transmissive element 404 including a 100 percent transmissive input portion 402, a reflective element 408, and a transparent element 412. The transparent element 412 is disposed between the transmissive element 404 and the reflective element 408. The transparent element 412 may be made of, for example, a glass or a transparent plastic. The transparent element 412 may also be referred to as a wave guide.

The reflective element 408 has a reflectivity of 100 percent. The reflective element 408 may include one or more metallic layers. Alternatively, the reflective element 408 may be one or more dielectric layers. The reflective element 408 may be applied to the transparent element 412 via an adhesive or applied to the transparent element 412 in another suitable manner.

The transmissive input portion 402, which is a portion of the transmissive element 404, transmits 100% of incident light. The transmissive element 404 includes different transmission at different locations. The transmissive element 404 may include one or more neutral density (ND) filters with different discrete regions designed to have predetermined transmission and reflectivity characteristics. As used herein, the term "neutral density" refers to a filter that is a filter that reduces or modifies the intensity of all wavelengths and colors of light equally. Alternatively, the transmissive element 404 may include one or more dielectric layers with different regions designed to have predetermined transmission and reflectivity characteristics. Alternatively, the transmissive element 404 may include metallic nanowires (e.g., silver) or metallic nanoparticles (e.g., gold) with different area density to provide predetermined transmission and reflectivity characteristics in different regions, respectively. Alternatively, the transmissive element 404 may be a refractive index mismatched interface (e.g., a photopolymer with controlled degree of polymerization) designed to provide predetermined transmission and reflectivity characteristics at different discrete regions, respectively. The transmissive element 404 may be applied to the transparent element 412 via an adhesive or applied to the transparent element 412 in another suitable manner.

Figure 5:
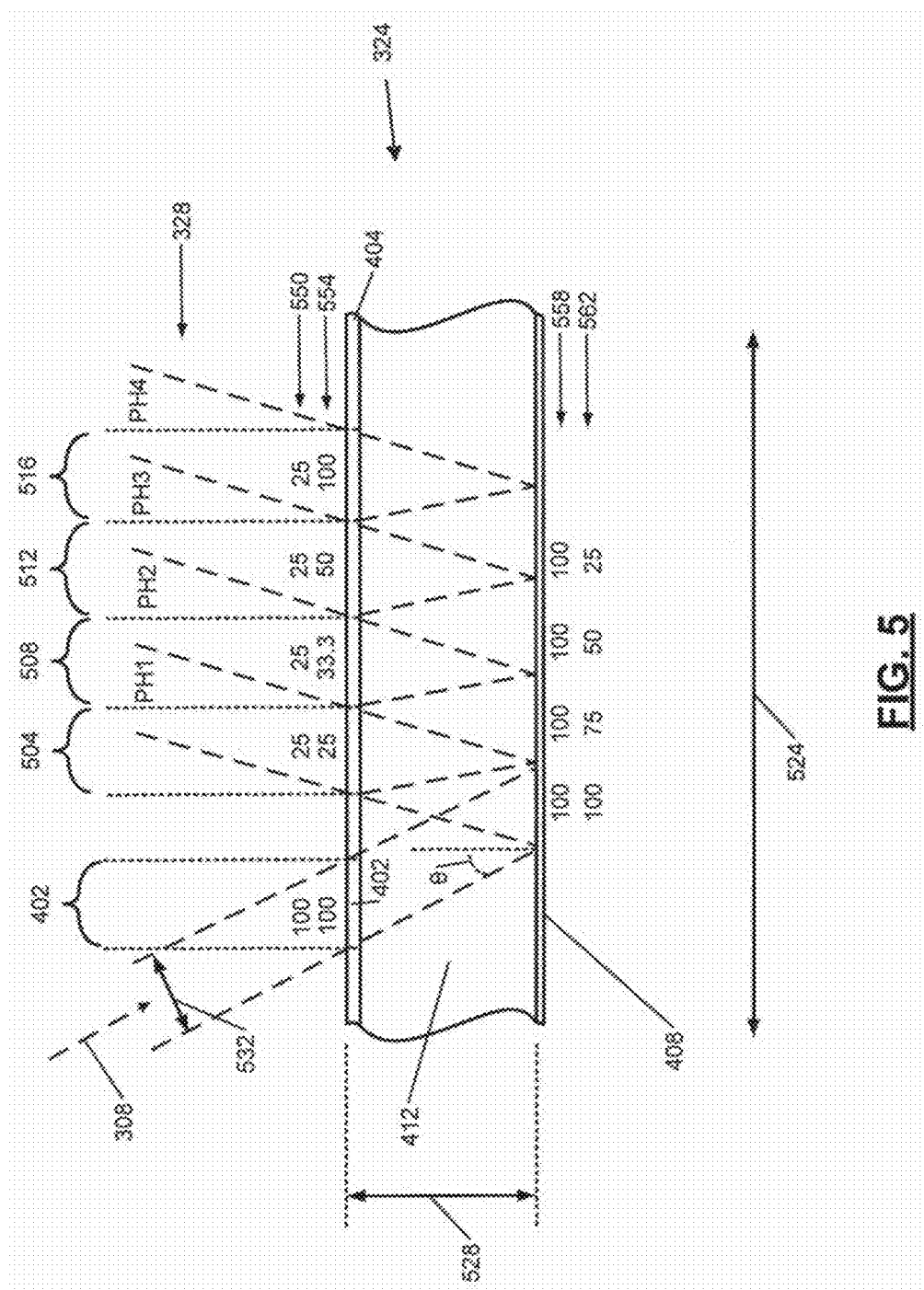
FIG. 5 includes another cross-sectional view of a portion of the replicator.

FIG. 5 includes another cross-sectional view of a portion of the replicator 324. The transmission of the transmissive element 404 may increase moving away from the location or transmissive input portion 402, where the phase hologram 308 is received at the replicator 324. For example, the transmissive element 404 may have a first predetermined transmission in a first region 504 where a first one (PH1) of the N replicated phase holograms 328 exits the replicator 324. The first predetermined transmission may be equal to or approximately equal to 25% or another suitable transmission.

The transmissive element 404 may have a second predetermined transmission in a second region 508 where a second one (PH2) of the N replicated phase holograms 328 exits the replicator 324. The second predetermined transmission is greater than the first predetermined transmission. The second predetermined transmission may be equal to or approximately equal to 33% or another suitable transmission.

The transmissive element 404 may have a third predetermined transmission in a third region 512 where a third one (PH3) of the N replicated phase holograms 328 exits the replicator 324. The third predetermined transmission is greater than the second predetermined transmission. The third predetermined transmission may be equal to or approximately equal to 50% or another suitable transmission.

The transmissive element 404 may have a fourth predetermined transmission in a fourth region 516 where a fourth one (PH4) of the N replicated phase holograms 328 exits the replicator 324. The fourth predetermined transmission is greater than the third predetermined transmission. The fourth predetermined transmission (transmittance) may be equal to or approximately equal to 100% or another suitable transmission. Each of the regions 504, 508, 512, 516 of the transmissive element 404 performs as a different discrete filter.

In the above example of FIG. 4, N is equal to 4, however N may be an integer greater than or equal to 2. With the first-fourth predetermined transmissions, the first-fourth ones of the N replicated phase holograms 328 may each have an intensity of 25% of the original phase hologram 308. The transmissions of the different regions may be configured such that the N replicated phase holograms 328 have equal or approximately equal intensities. FIG. 5 includes example intensities 550, transmissions 554, reflectivities 558 and intensities 562. The above may be different, similar or identical for a second replicator that replicates the phase hologram 308 in a second direction.

The transmissive element 404 of FIGS. 4-5 has a fifth predetermined transmission in the region 402 where the phase hologram 308 is input to the replicator 324. The fifth predetermined transmission may be equal to or approximately equal to 100% or another suitable transmission.

Lengths 524 of the regions 402 and 504-516 are equal. The reflective element 408 has a reflectivity of 100% and reflects all of the received light back toward the transmissive element 404.

A depth (thickness) 528 of the replicator 324 is selected to satisfy the relationship 2.

$$0 \text{ mm} \leq 2*D*\tan\theta - H \leq \text{predetermined minimum human pupil size}(e.g., 2 \text{ mm}) \quad (2)$$

For the relationship 2, D is the depth 528 of the replicator 324 (e.g., the transparent element 412), tan represents use of the tangent function, H is the length 532 of the phase hologram 308, and θ is the incident angle that the phase hologram 308 is input to the replicator 324. The thicker the replicator, the larger the gaps between holograms.

Figure 6:
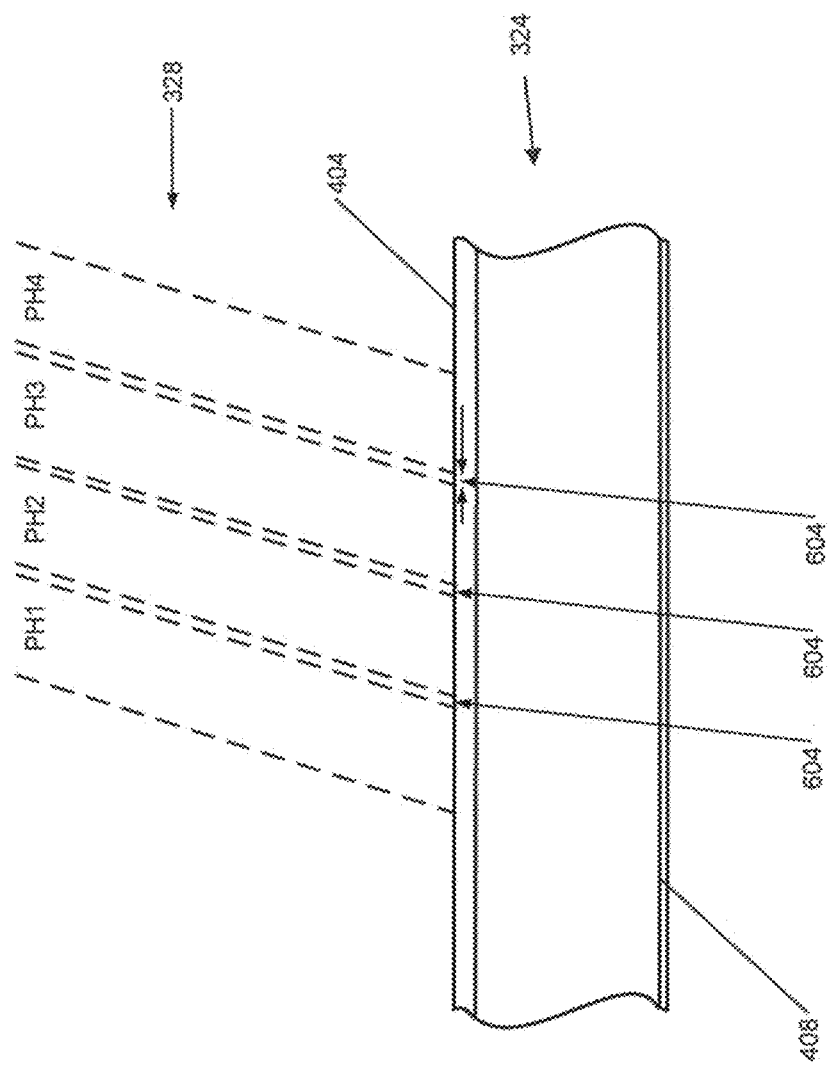
FIG. 6 includes another cross-sectional view of a portion of the replicator illustrating gaps between replicated phase holograms.

FIG. 6 includes another cross-sectional view of a portion of the replicator 324 illustrating gaps 604 between the N replicated phase holograms 328. The gaps 604 may have the same length.

Figure 7:
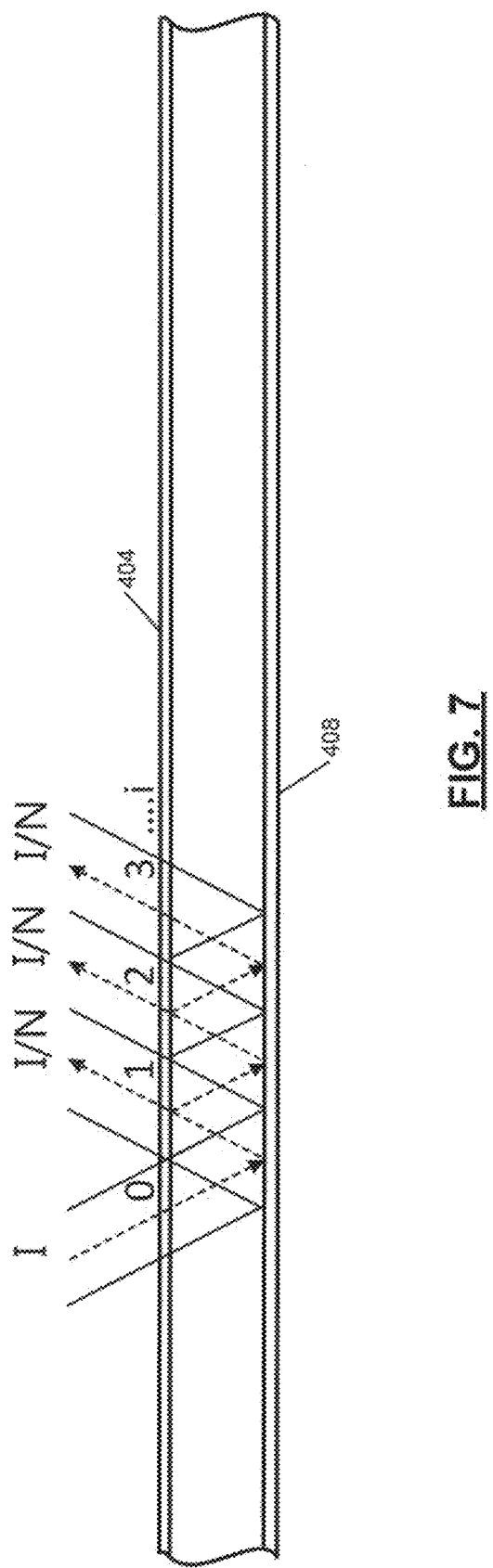
FIG. 7 includes another cross-sectional view of a portion of the replicator.

FIG. 7 includes another cross-sectional view of a portion of the replicator 324 of FIG. 3. FIG. 7 illustrates that if the phase hologram 308 is replicated N times and has an intensity of I, the intensity of each consecutive one of the N replicator phase holograms 328 decreases by I/N. The transmission of the transmissive element 404 of a region satisfies the relationship 3.

$$T_i = \frac{\frac{1}{N}}{1 - \frac{i-1}{N}} * 100\%, \text{ and } R_i = 1 - T_i \quad (3)$$

For the relationship 3, $T_i$ is the transmission in a region of the transmissive element 404 for an i-th one of the N replicated phase holograms 328, $R_i$ is the reflectivity in the region for the i-th one of the N replicated phase holograms 328, i is the i-th one of the N replicated phase holograms 328.

Figure 9:
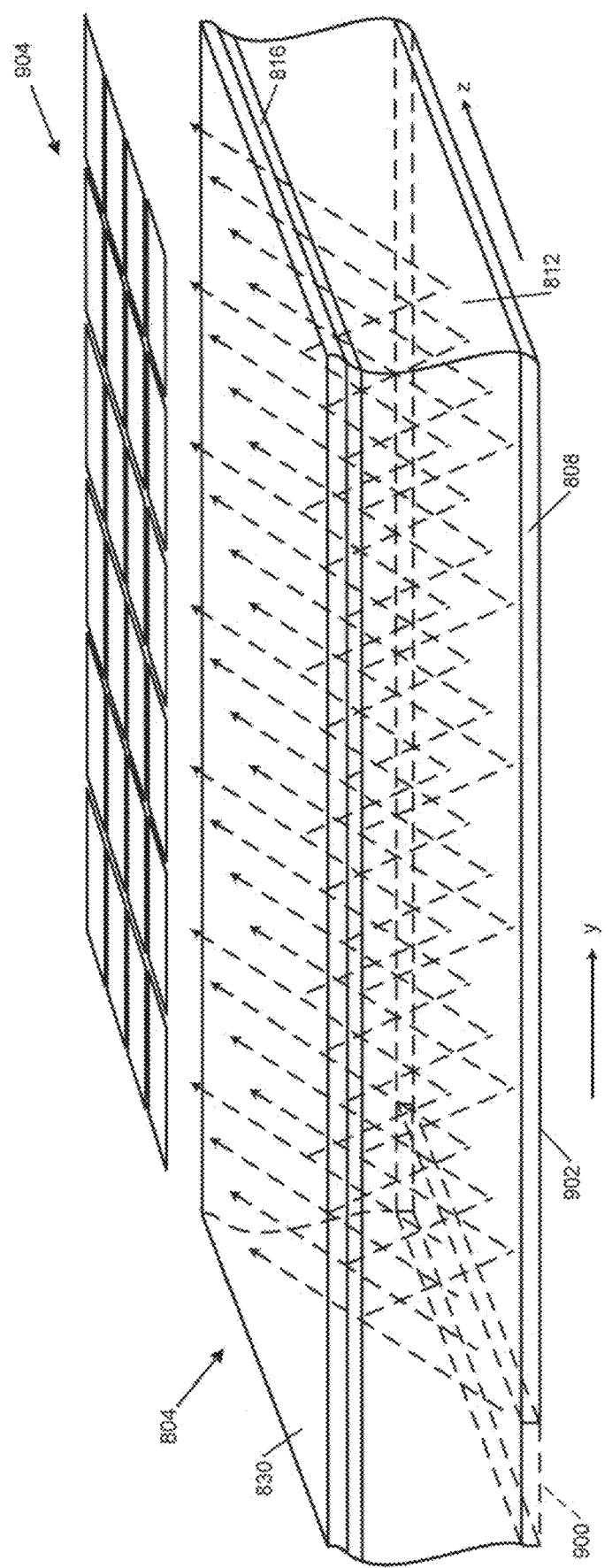
FIG. 9 is a cross-sectional view of one of the replicators of the replicator assembly of FIG. 8.

FIG. 8 shows a replicator assembly 800 including multiple replicators 802, 804. The replicators 802, 804 are for two different replicating directions. For example, the replicator 802 may replicate a hologram in a z-direction and the replicator 804 may replicate holograms out of the replicator 802 in the y-direction, which corresponds with the overall hologram (or array of holograms) shown in FIG. 1. An example of the replication of the replicator 804 is shown in FIG. 9. Each of the replicators 802, 804 includes respective reflective elements 806, 808, transparent elements 810, 812, and transmissive elements 814, 816. The reflective elements 806, 808 may be implemented as 100% reflective layers. The transparent elements 810, 812 may be implemented as 100% transparent layers.

The transmissive elements 814, 816 perform as neutral density filter layers that are partially transmissive and partially reflective. Each of the transmissive elements 814, 816 may include a 100% transmissive (or transparent) portion and a partially transmissive (non-transparent) portion. In one embodiment, the 100% transmission portion is not included, and the incident hologram is received directly by the transparent element 810. The 100% transmissive portion and the partially transmissive portion of the transmissive element 814 are shown and designated respectively 820, 822. There are no gaps in the partially transmissive portion of the elements 814, 816, which are implemented as continuous neutral density filters. As such, there are no gaps between different phase regions 821, 823, 825, 827 of the partially transmissive regions 822. The continuous neutral density filters provide (i) a gradual change in intensity filtering and reflecting characteristics across the different phase regions, or (ii) provide uniform intensity filtering and reflecting characteristics across the different phase regions. Regions of the transmissive element 814 outside of the portion 820 and the phase regions 821, 823, 825, and 827 may not be transmissive, such as the region 829. The transmissive element 816 may have similar portions and regions as the transmissive element 814.

Figure 10:
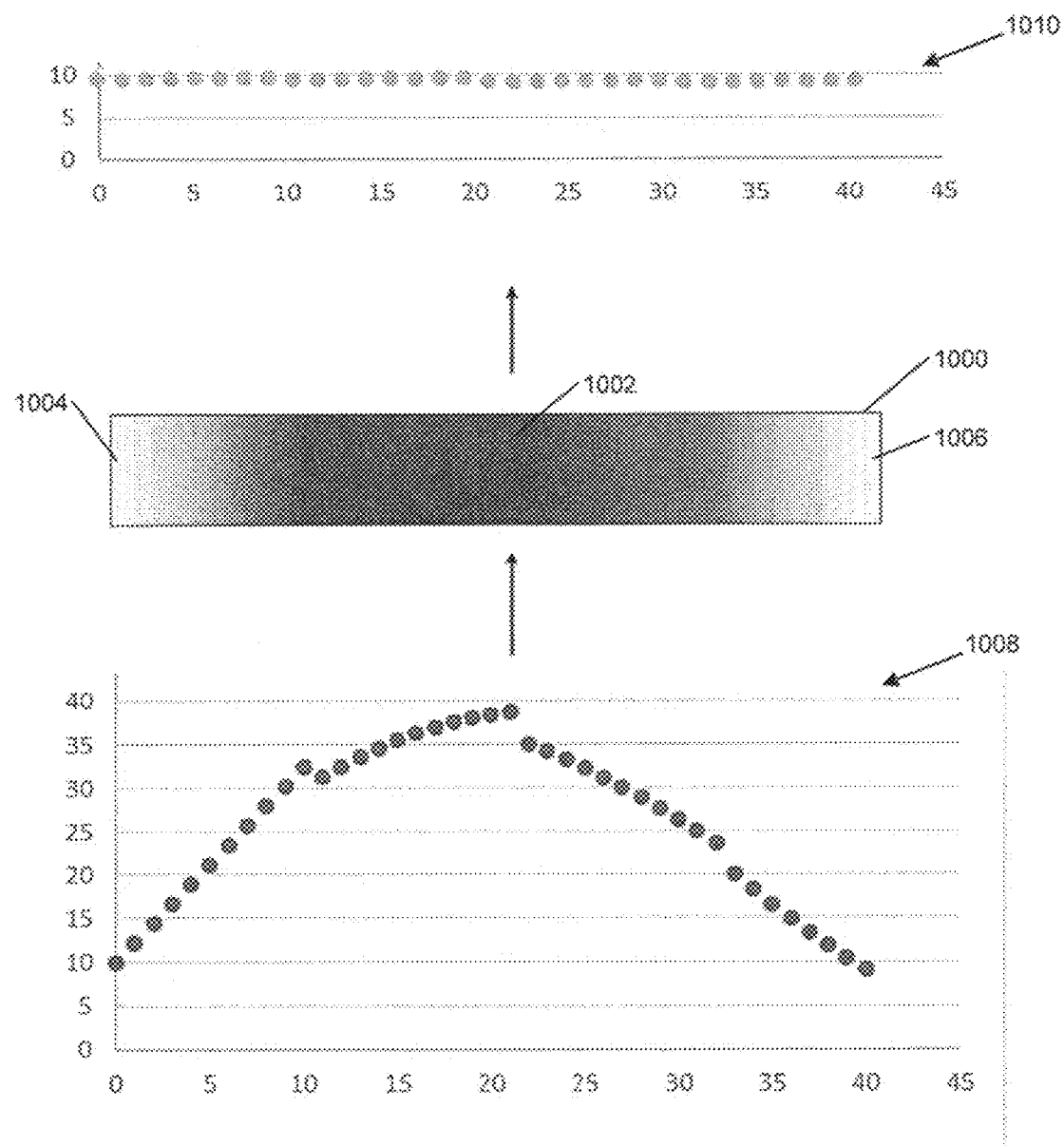
FIG. 10 is a diagram illustrating transmitted intensities prior to and subsequent to passing through a corrective leveling element implemented as a nanoparticle absorptive filter having varying densities.

In the example of FIG. 8, the partially transmissive portion 822 is referred to as a gradient portion and is a continuously varying transmissive filter having a continuous transmission gradient. In an embodiment, the continuous transmission gradient varies from 10% near the transmissive portion 820 to 100% at an end of the continuous transmission gradient furthest from the transmissive portion 820. Example transmission percentages are provided for points between hologram phases PH1-PH4. The transmission percentages 826 at points between hologram phases are different for a different number of reflections (e.g., a number of reflections other than 4). Although the gradient portion is shown as transitioning between 10-100%, the transition portion may transition between other transmitted intensity percentages. Examples of the reflectivity percentages 831 are also shown. An example output plot for the gradient transmissive output is shown in FIG. 10.

Figure 12:
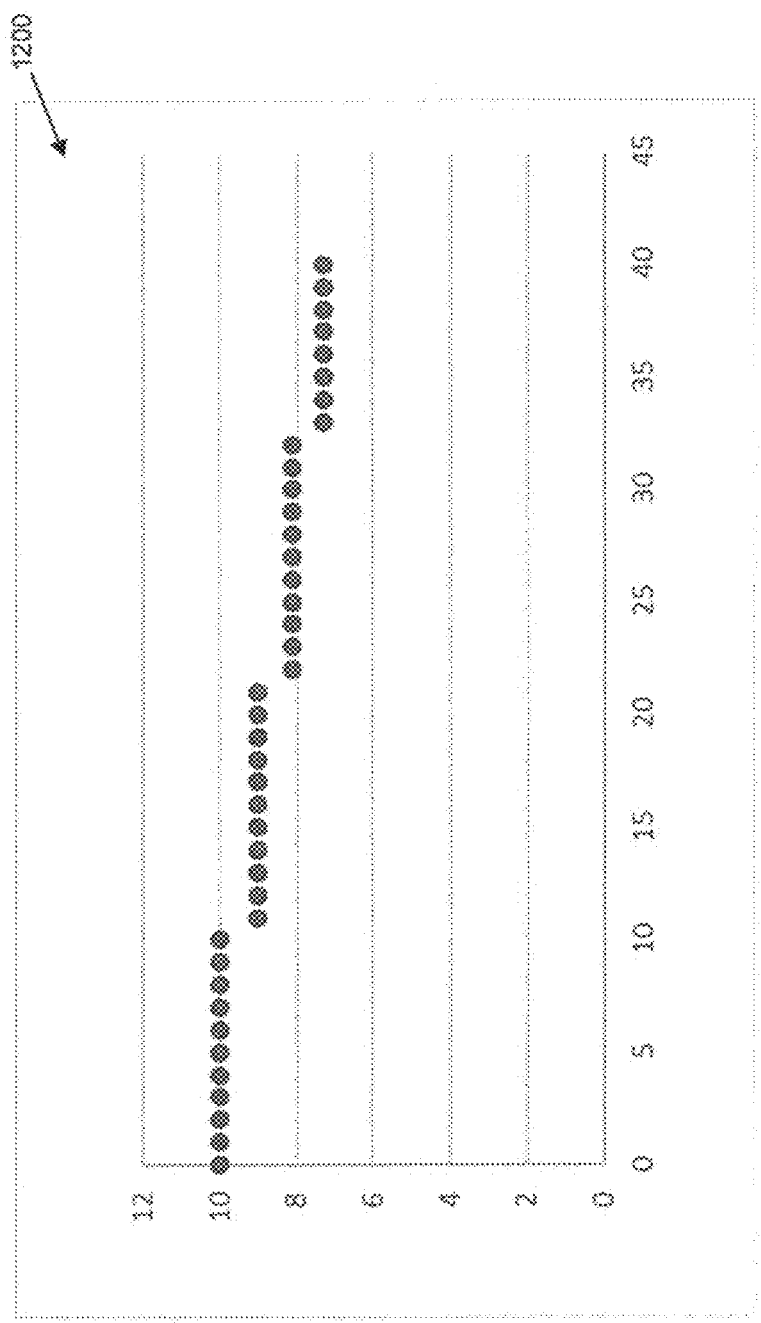
FIG. 12 is a graph of transmitted intensity for a neutral density filter layer of a replicator having a uniform transmission characteristic.

In another embodiment, the partially transmissive portion 822 has a uniform transmissive level and thus does not have a transmissive gradient. As an example, the uniform transmissive level may be 10% or other suitable percentage. An example output plot for the uniform transmissive level example is shown in FIG. 12.

An incident phase hologram 308 is received at the transmissive portion 820 and reflected by the reflective element 806. The phase hologram 308 is at least partially reflected by each of the reflective element 806 and the transmissive element 814 multiple times to provide multiple phase holograms. The phase holograms are at least partially passed through the transmissive element 814, through a gap between the replicators 802, 804, and to the replicator 804.

The replicator 804 also includes a corrective leveling element 830. FIG. 9 shows an example of the replicator 804. The corrective leveling element 830 is disposed on the transmissive element 816. The corrective leveling element 830 may be formed of a light absorptive material that adjusts intensity levels of the phase holograms (i) to have a same predetermined intensity level and/or an intensity level within a predetermined range of the predetermined intensity level, and/or (ii) to be within a predetermined intensity range of each other. The elements 806, 808, 810, 812, 814, and 816 are not absorptive. By not being absorptive, the elements 806, 808, 810, 812, 814, and 816 preserve a higher light efficiency. FIG. 10 illustrates an example corrective leveling layer adjusts intensity levels of the phase holograms out of the replicator 802 to be within a predetermined range of each other.

There is no gap between the reflective elements 806, 808 and the corresponding transparent elements 810, 812. There is also no gap between the transparent elements 810, 812 and the corresponding transmissive elements 814, 816. There is a gap G between the replicators 802, 804 and thus between the transmissive element 814 and the reflective element 808. In one embodiment, the gap G is minimized and/or set to be less than a predetermined distance to minimize energy loss.

The reflective elements 806, 808 may be formed of, for example, metallic materials and/or reflective dielectric materials. The transparent elements 810, 812 perform as light guides and may be formed of, for example, glass, transparent plastic and/or other suitable transparent materials. The transmissive elements 814, 816 are neutral density filters and may each include one or more dielectric layers. The dielectric layers may include a sputtered silver nanowire or other type of transparent conductive layers that are partially transmissive and partially reflective. In one embodiment, the dielectric layers include indium tin oxide (ITO). The corrective leveling element 830 is another type of neutral density filter that is absorptive and provides an inverse intensity gradient to compensate for intensity gradients out of the adjacent transmissive element 816. The corrective leveling element 830 may be formed by density variation of absorptive dyes. The corrective leveling element 830 may be applied and/or adhered to the transmissive element 816.

Figure 11:
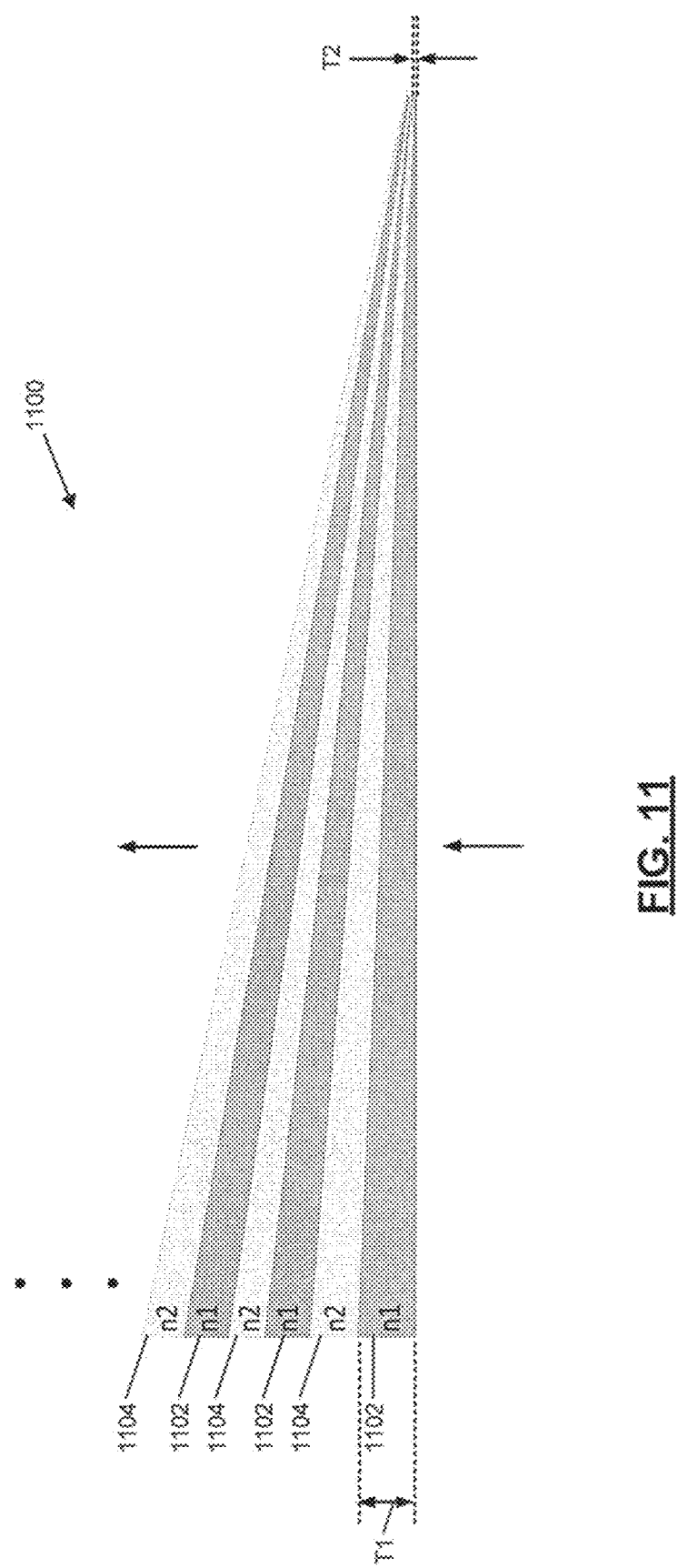
FIG. 11 is a cross-section side view of a corrective leveling element including multiple dielectric layers with alternating indexes of refraction, transmission and reflection gradients, and thickness gradients.

In one embodiment, the corrective leveling element 830 includes a nanoparticle density distribution, an example of which is shown in FIG. 10. For this example, the corrective leveling element 830 may include silver nanowires and/or metallic nanoparticles. In another embodiment, the corrective leveling element 830 may include multiple dielectric layers, an example of which is shown in FIG. 11.

The make-up of the elements 806, 808, 810, 812, 814, 816 and 830 provide the replicator assembly 800 having continuous transmittance across an output of the replicator assembly 800. The replicator assembly 800 replicates an incident phase hologram using continuous transmittance as described. The continuous transmittance is provided at first interfaces and high reflectivity provided at second interfaces. The first interfaces may refer to the interfaces between elements 810, 814, between elements 812, 816 and between elements 816, 830. The second interfaces may refer to the interfaces between elements 806, 810 and between elements 808, 812.

As described above, there is a minimal gap between adjacent holograms output from the corrective leveling element 830. The gaps may satisfy the above relationships 1-2. The gaps may be adjusted by adjusting thickness of replicators and/or elements and layers thereof. The holograms are provided without overlap. In one embodiment, the gaps are greater than 0 and less than or equal to a predetermined minimum human pupil size.

The replicator 802 is configured to output N replications of an incident hologram. The replicator 804 is configured to output M replications of incident holograms (e.g., M replications of the N replications) received from the output of the replicator 802. N and M are integers greater than or equal to 2. The transmissive element 814 is configured to output the N replications and reflect N−1 of the N replications. The transmissive element 816 is configured to output N×M replications and reflect N×M−N of the N×M replications. The reflective element 806 is configured to reflect the incident hologram and the N−1 replications. The reflective element 808 is configured to reflect the N incident replications and the N×M−N replications.

Although FIG. 8 shows a replicator assembly including multiple replicators, a single replicator including the corrective leveling layer may be implemented. For example, the replicator 802 may be implemented alone and include a corrective leveling layer disposed on and covering the partially transmissive portion of the transmissive element 814. As an alternative the replicator 804 may be implemented alone and directly receive a hologram.

FIG. 9 shows the replicator 804 including the reflective element 808, the transparent element 812, the transmissive element 816 and the corrective leveling element 830. The reflective element 808 may not extend fully across a surface (e.g., bottom surface) of the transparent element 812 as shown or may include a transparent portion for receiving the output of the replicator 802 of FIG. 8. In the example shown, the output of the replicator 802 is provided directly to the transparent element 812 and then reflected multiple times by the transmissive element 816 and the reflective element 808. In another embodiment, the reflective element 808 extends fully across the transparent element 812, but includes a transparent (non-reflective) portion as shown by dashed area 900 and a reflective portion 902.

Dashed lines are provided to illustrate the reflections of a point of each of the received holograms. The other points of each of the holograms are similarly reflected. A cross-sectional planar slice 904 through the output of the replicator 804 is provided to show N (e.g., 4) replicated phase holograms in the z-direction and M (e.g., 6) replicated phase holograms in the y-direction. This is consistent with the above examples for the array shown in FIG. 1. N and M may be integers greater than or equal to 2.

FIG. 10 shows a diagram illustrating transmitted intensities prior to and subsequent to passing through an example corrective leveling element 1000, which is implemented as a nanoparticle absorptive filter having varying densities and corresponding transmission areas. The corrective leveling element 1000 may replace the corrective leveling element 830 of FIGS. 8-9. As is shown, the corrective leveling filter 1000 has a highest concentration (or highest density) of nanoparticles in a center region 1002 and a least amount of (or lowest density) of nanoparticles in outer regions 1004, 1006. This reduces the intensities in the center region the most and gradually less towards the outer regions.

A first plot 1008 is shown relating transmitted intensity levels versus location in an eye box (or distance in the z direction). This plot is an example, illustrating the output of the replicator 802 when a corrective leveling filter is not used. At a point of the gradient portion nearest the transparent portion the transmission percentage is lowest (e.g., 10%) and the intensity percentage due to reflection is highest (e.g., 100%). At a point of the gradient portion furthest from the transparent portion the transmission percentage is highest (e.g., 100%), but the intensity percentage due to reflection is lowest (e.g., 10%). Thus, as can be seen the transmitted intensity is not uniform and is highest in a center point (e.g., 20 millimeters (mm)) this is due to the 55% transmission percentage and partially reduced intensity of the reflected phase hologram. After one reflection of the incident hologram, the intensity level distribution is no longer uniform and reflectance of the transmissive element is not uniform. Although the gradient portion is shown as transitioning between 10-100%, the transition portion may transition between other transmitted intensity percentages.

Applying a corrective leveling element, such as the corrective leveling element 830, to the replicator 802, adjusts the output as shown in the first plot 1008 to provide the output provided in a second plot 1010. As shown, the transmitted intensity levels are approximately the same. A similar output is provided by the corrective leveling element 830 when implemented on the replicator 804 of FIGS. 8-9.

In one embodiment, the output of the corrective leveling element 830 is uniform across the output of the corrective leveling element 830. In this example embodiment, each outputted hologram in the array of holograms has the same intensity and each hologram has uniform intensity. The densities of the nano-pigments in the corrective leveling element 830, which absorb red (R), green (G), and blue (B) wavelengths are tailored to precisely compensate for varying intensities (or intensity distribution) in received holograms and across the array of holograms to provide a uniform intensity distribution output.

FIG. 11 shows another example corrective leveling element 1100 that may replace the corrective leveling element 830 of FIGS. 8-9. The corrective leveling element 1100 includes multiple dielectric layers. In the example shown the corrective leveling element 1100 includes dielectric layers 1102, 1104. The dielectric layers 1102, 1104 are arranged in an alternating pattern and have respective indexes of refraction n1, n2. Each of the dielectric layers 1102, 1104 has a different index of refraction than the corresponding adjacent one or two layers, depending on whether the layer is a top most, middle, or bottom most layer. Any number of the dielectric layers 1102, 1104 may be stacked. In one embodiment, n1 is greater than n2. In another embodiment, n2 is greater than n1. There is no gap between the dielectric layers 1102, 1104.

Each of the dielectric layers 1102, 1104 has a thickness gradient, such that the thickness of each of the dielectric layers 1102, 1104 gradually transitions from a greatest thickness (e.g., T1) at a first end to a smallest thickness (e.g., T2) at a second end. At a same side, the thicknesses of the dielectric layers 1102 may be the same or different than the thicknesses of the dielectric layers 1104. The thicknesses of the dielectric layers 1102 at a same end may be the same or different. Similarly, the thicknesses of the dielectric layers 1104 at a same end may be the same or different. Due to the thickness gradients of each of the dielectric layers 1102, 1104 and/or the make-up of each of the dielectric layers 1102, 1104, transmission gradients exist across the output area of each of the dielectric layers 1102, 1104. Reflective gradients may also exist across the output area of each of the dielectric layers 1102, 1104.

The thickest end of the corrective leveling element 1100, corresponding to the thickest end of the dielectric layers 1102, 1104, may have the lowest transmission percentage. Similarly, the thinnest end of the corrective leveling element 1100, corresponding to the thinnest end of the dielectric layers 1102, 1104, may have the highest transmission percentage.

FIG. 12 shows a graph 1200 of transmitted intensity for a neutral density filter layer of a replicator having a uniform transmission characteristic. The example is for a replicator replicating a hologram four times. Four levels of transmitted intensity are shown, one for each phase hologram and corresponding number of reflections. The hologram created by the most number of reflections has the lowest transmitted intensity. The decreased levels of transmitted intensity are directly related to the number of reflections. As an example, this graph may illustrate an output of a first replicator for a first (e.g., z) direction, which may be provided to a second replicator also having a uniform transmissive characteristic. The first replicator does not have a corrective leveling element and the second replicator has a corrective leveling element, which levels the resulting output to provide a uniform output intensity distribution similar to that shown in FIG. 10.

The above disclosed examples include replicator assemblies that expand exit pupil of a holographic display. With an enlarged exit pupil, the size of the eye box of the holographic display is enlarged.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A replicator assembly comprising:
   a first replicator comprising:
      a first reflective element configured to receive and reflect a first hologram generated by one or more light sources and one or more modulators of a head up display system;
      a first transmissive element comprising a partially transmissive portion, wherein the partially transmissive portion is configured to receive a reflection of the first hologram from the first reflective element, output N replications of the first hologram, and reflect at least N−1 replications of the first hologram, wherein the partially transmissive portion is implemented as a continuous transmission neutral density filter across different phase regions, wherein the phase regions of the partially transmissive portion correspond respectively to the N replications, where N is an integer greater than or equal to 2, and wherein the first reflective element is configured to reflect at least the N−1 replications of the first hologram; and
      a first transparent element disposed between the first reflective element and the first transmissive element and configured to guide the N replications of the first hologram between the first reflective element and the first transmissive element; and
   a corrective leveling element disposed on the first transmissive element and configured to:
      receive the N replications of the first hologram output from the first transmissive element; and
      adjust light intensity levels, such that light intensity levels of N replications of the first hologram output from corrective leveling element are more uniform than the light intensity levels of the N replications of the first hologram output from the first transmissive element.

2. The replicator assembly of claim 1, wherein:
   the first transmissive element comprises a fully transmissive portion;
   the fully transmissive portion is configured to receive the first hologram generated by the one or more light sources of a head up display system; and
   the first transparent element is configured to guide the first hologram from the fully transmissive portion to the first reflective element.

3. The replicator assembly of claim 1, wherein the partially transmissive portion has an intensity gradient across an output of the partially transmissive portion.

4. The replicator assembly of claim 1, wherein the partially transmissive portion has an intensity distribution across an output of the partially transmissive portion such that output light intensities of the N replications are at least one of at a same level or within a predetermined range of each other.

5. The replicator assembly of claim 1, wherein:
   the first replicator outputs the N replications with gaps between the N replications; and
   each of the gaps are greater than 0 and less than or equal to a predetermined minimum human pupil size.

6. The replicator assembly of claim 1, wherein:
the corrective leveling element includes an absorption gradient across an output of the corrective leveling element; and
the absorption gradient is based on a density of at least one of nanowires or nanoparticles in the corrective leveling element.

7. The replicator assembly of claim 1, wherein:
the corrective leveling element includes multiple dielectric layers; and
at least two of the dielectric layers have different indexes of refraction and a thickness gradient across an output of the corrective leveling element.

8. The replicator assembly of claim 1, wherein:
the first reflective element is in contact with the first transparent element; and
the first transparent element is in contact with the first transmissive element.

9. The replicator assembly of claim 1, wherein:
no gaps exist between the first reflective element and the first transparent element; and
no gaps exist between the first transparent element and the first transmissive element.

10. A head up display system comprising:
the replicator assembly of claim 1;
a control module configured to generate signals based on data, wherein the data includes at least one operating parameter; and
the one or more light sources and the one or more modulators configured to generate the first hologram based on the signals.

11. A replicator assembly comprising:
a first replicator comprising:
  a first reflective element configured to receive and reflect a first hologram generated by one or more light sources and one or more modulators of a head up display system;
  a first transmissive element comprising a partially transmissive portion, wherein the partially transmissive portion is configured to receive a reflection of the first hologram from the first reflective element, output N replications of the first hologram, and reflect at least N−1 replications of the first hologram, wherein the partially transmissive portion is implemented as a continuous transmission neutral density filter across different phase regions, wherein the phase regions of the partially transmissive portion correspond respectively to the N replications, where N is an integer greater than or equal to 2, and wherein the first reflective element is configured to reflect at least the N−1 replications of the first hologram; and
  a first transparent element disposed between the first reflective element and the first transmissive element and configured to guide the N replications of the first hologram between the first reflective element and the first transmissive element;
a second replicator comprising:
  a second reflective element configured to receive and reflect the N replications of the first hologram output from the first transmissive element;
  a second transmissive element comprising a partially transmissive portion, wherein the partially transmissive portion is configured to receive reflections of the N replications from the second reflective element, output N×M replications of the first hologram, and reflect at least N×M−N replications of the first hologram,
  wherein the partially transmissive portion of the second transmissive element is implemented as a continuous transmission neutral density filter across different phase regions, wherein the phase regions of the partially transmissive portion of the second transmissive element correspond respectively to the N×M replications, and wherein the second reflective element is configured to reflect at least the N×M−N replications of the first hologram;
  a second transparent element disposed between the second reflective element and the second transmissive element and configured to guide the N×M replications of the first hologram between the second reflective element and the second transmissive element; and
  a corrective leveling element disposed on the second transmissive element and configured to
    receive the N×M replications of the first hologram output from the second transmissive element, and
    adjust light intensity levels, such that light intensity levels of N×M replications of the first hologram output from corrective leveling element are more uniform than the light intensity levels of the N×M replications of the first hologram output from the second transmissive element.

12. The replicator assembly of claim 11, wherein:
the partially transmissive portion of the second transmissive element is implemented as a continuous transmission neutral density filter without gaps between different phase regions;
the phase regions of the partially transmissive portion of the second transmissive element correspond respectively to the N×M replications; and
M is an integer greater than or equal to 2.

13. The replicator assembly of claim 11, wherein:
the second replicator outputs the N×M replications with gaps between the N×M replications; and
each of the gaps are greater than 0 and less than or equal to a predetermined minimum human pupil size.

14. A replicator assembly for a head up display system, the replicator assembly comprising:
a first replicator receive a first hologram generated by one or more light sources and one or more modulators of a head up display, replicate the first hologram N times, and output N replications of the first hologram, where N is an integer greater than or equal to 2;
a corrective leveling element configured to adjust light intensity levels of the N replications of the first hologram, such that light intensity levels of N replications output from corrective leveling element are more uniform than the light intensity levels of the N replications of the first hologram output from the first replicator; and
a second replicator disposed between the first replicator and the corrective leveling element, wherein:
  the second replicator is configured to receive the N replications, replicate the N replications M times, and output N×M replications of the first hologram; and
  the corrective leveling element is configured to adjust light intensity levels of the N×M replications of the first hologram, such that the light intensity levels of the N×M replications output from corrective leveling element are more uniform than the light intensity levels of the N×M replications output from the second replicator.

15. The replicator assembly of claim 14, wherein:
the first replicator includes a partially transmissive portion;
the partially transmissive portion is implemented as a continuous transmission neutral density filter without gaps between different phase regions of the partially transmissive portion; and
the phase regions correspond respectively to the N replications.

16. The replicator assembly of claim 14, wherein:
the second replicator includes a partially transmissive portion;
the partially transmissive portion of the second replicator is implemented as a continuous transmission neutral density filter without gaps between different phase regions of the partially transmissive portion of the second replicator; and
the phase regions of the partially transmissive portion of the second replicator correspond respectively to the N×M replications.

17. A replicator assembly for a head up display system, the replicator assembly comprising:
a first replicator receive a first hologram generated by one or more light sources and one or more modulators of a head up display, replicate the first hologram N times, and output N replications of the first hologram, where N is an integer greater than or equal to 2; and
a corrective leveling element configured to adjust light intensity levels of the N replications of the first hologram, such that light intensity levels of N replications output from corrective leveling element are more uniform than the light intensity levels of the N replications of the first hologram output from the first replicator, wherein:
the corrective leveling element includes an absorption gradient across an output of the corrective leveling element; and
the absorption gradient is based on a density of at least one of nanowires or nanoparticles in the corrective leveling element.

18. A replicator assembly for a head up display system, the replicator assembly comprising:
a first replicator receive a first hologram generated by one or more light sources and one or more modulators of a head up display, replicate the first hologram N times, and output N replications of the first hologram, where N is an integer greater than or equal to 2; and
a corrective leveling element configured to adjust light intensity levels of the N replications of the first hologram, such that light intensity levels of N replications output from corrective leveling element are more uniform than the light intensity levels of the N replications of the first hologram output from the first replicator, wherein:
the corrective leveling element includes multiple dielectric layers; and
at least two of the dielectric layers have different indexes of refraction and a thickness gradient across an output of the corrective leveling element.

* * * * *